(12) United States Patent
Ishii

(10) Patent No.: US 7,004,521 B2
(45) Date of Patent: Feb. 28, 2006

(54) SUCTION-HOLDING DEVICE

(75) Inventor: Akinori Ishii, Miki (JP)

(73) Assignee: Ishii Chokokogu Mfg. Co., Ltd., Hyogo (JP)

( * ) Notice: Subject to any disclaimer, the term of this patent is extended or adjusted under 35 U.S.C. 154(b) by 81 days.

(21) Appl. No.: 10/336,560

(22) Filed: Jan. 3, 2003

(65) Prior Publication Data

US 2004/0251702 A1    Dec. 16, 2004

(51) Int. Cl.
 *B25J 15/06* (2006.01)
(52) U.S. Cl. .................................. 294/64.1
(58) Field of Classification Search ............... 294/64.1, 294/65, 902; 269/21; 414/627, 737, 752.1; 901/40
See application file for complete search history.

(56) References Cited

U.S. PATENT DOCUMENTS 2,303,393 A * 12/1942 Schmidt ................ 294/64.1
2,370,938 A *  3/1945 Cohen .................. 294/64.1
2,420,811 A *  5/1947 Brewster et al. ......... 294/64.1
2,871,054 A *  1/1959 Zinke ................... 294/64.1
3,326,593 A *  6/1967 Farmer et al. ........... 294/64.1
3,377,096 A *  4/1968 Wood ................... 294/64.1
3,640,562 A *  2/1972 Creskoff ................... 294/65
5,013,075 A *  5/1991 Littell ................... 294/64.1

* cited by examiner

Primary Examiner—Dean J. Kramer
(74) Attorney, Agent, or Firm—Koda & Androlia

(57) ABSTRACT

A suction-holding device including: a base disk body having a hollow cavity section in its undersurface, a suction disk disposed beneath the base disk body so as to cover the hollow cavity section, and an operating rod which is disposed vertically on an embedded plate installed in the top portion of the suction disk and to which an operating handle is connected so that the operating handle is pivotally moved up and down and so that the suction disk is suction-held to and released from a surface of an object by way of raising and lowering the operating handle; and the suction disk being provided on its suction-holding surface with an annular sponge plate body.

1 Claim, 4 Drawing Sheets

US 7,004,521 B2

SUCTION-HOLDING DEVICE

BACKGROUND OF THE INVENTION

1. Field of the Invention

The present invention relates to a suction-holding device which is attached by suction to the surfaces of various objects and used to move these objects, etc.

2. Prior Art

In the past, suction-holding devices have been widely used in order to move pieces of glass and large tiles, etc. that have flat suffices. Suction-holding devices of this series that have been proposed include: a die-cast base disk body having a rim downwardly protruding from the outer circumference of its undersurface face so as to form a hollow cavity section that opens in the downward direction; a suction disk disposed beneath the base disk body so as to cover the hollow cavity section, the suction disk being made of a rubber material and having a slightly larger diameter than the base disk body; an operating rod provided vertically on an embedded plate that is embedded in the top portion of the suction disk; and an operating handle which is disposed on the base disk body so as to pivot up and down and to which the operating rod protruded on the base disk body is connected.

In this suction-holding device, suction-holding of the suction disk to the surface of an object is accomplished by raising the operating handle upward, and the release of the suction-holding of the suction disk from the surface of the object is accomplished by pushing the operating handle down. Since a strong suction-holding force is obtained by causing the suction-holding of the suction disk to the surface of the object, such a suction-holding device is widely used in work in which the suction-holding device is used to lift and move the object.

As shown in FIG. 4(a), in order to stabilize the suction-holding state of the suction disk with respect to the surface of the object, an annular projection 6a in which a sharp rim 6b is formed by joining an outside inclined suffice and an inside vertical surface is formed as an integral unit with the suction disk 6 on the outer circumferential portion of the suction-holding surface of the suction disk 6. During use, the suction-holding to the surface of the object pushes the annular projection 6a against the surface of the object. When the operating handle is raised upward in this state so that the top portion of the suction disk is forcefully lifted via the operating rod, the space inside the suction disk surrounded by the annular projection 6a is placed in a vacuum state, and the annular projection 6a is deformed into a shape in which this projection is bent inward around the entire circumference (i.e., a shape in which the sharp rim 6b is pulled inward). As a result, the outside inclined surface forming the annular projection 6a adheres tightly to the surface of the object and is stabilized around the entire circumference as shown in FIG. 4(b).

When the suction-holding device that has a suction disk on which an annular projection is formed as described above is used, considering the state in which the annular projection adheres tightly to the surface of the object, the annular projection is deformed into a shape that is bent inward around the entire circumference as the degree of vacuum in the space inside the suction disk surrounded by the annular projection increases. Accordingly, the outside inclined surface that forms the annular projection contacts the surface of the object with the sharp rim on the inside, and the inclined surface adopts a width that is proportional to the degree of vacuum inside the suction disk, so that this inclined surface adheres tightly to the surface of the object in this range.

However, in the case of a suction disk in which the inclined surface that forms the annular projection is caused to adhere tightly to the surface of the object as described above, in order to prevent outside air from invading the interior of the suction disk, not only are there limits to the width of the inclined surface of the annular projection that is caused to adhere tightly to the surface of the object, but the objects that can be handled are also limited to objects that have a smooth surface. In other words, objects that are suctioned and moved, etc. using such a suction-holding device that has a suction disk on which an annular projection is formed are limited to pieces of glass and tiles, etc. that have flat surfaces.

SUMMARY OF THE INVENTION

Accordingly, the object of the present invention is to provide a suction-holding device which makes it possible to obtain a strong suction-holding force and which can therefore be used for the movement of relatively large tiles, etc. made of stone materials such as granite and having surfaces that are worked into rough surfaces.

In order to solve the above-described problems, in the suction-holding device of the present invention: a hollow cavity section is formed in the undersurface of a base disk body; a suction disk is disposed beneath the base disk body so that this suction disk covers the hollow cavity section; and an operating rod which is provided vertically on an embedded plate that is embedded in the top portion of the suction disk is connected to an operating handle which is disposed on the base disk body so that the operating handle can be freely raised upward and pushed down, and the suction-holding of the suction disk to the surface of an object, as well as the release of this suction-holding, are accomplished by the raising and lowering operation of the operating handle; and further the suction-holding surface of the suction disk is provided with an annular sponge plate body.

Here, the basic construction of the suction-holding device of the present invention, and the manner in which the suction disk is attached by suction to the surface of an object and used is substantially the same as that of the known suction-holding devices.

In the suction-holding device of the present invention, which is constructed as described above, when the annular sponge plate body is pressed against the surface of the object during use, and the top portion of the suction disk is forcefully lifted via the operating rod by raising the operating handle from this state, the space inside the suction disk surrounded by the annular sponge plate body is caused to expand so that this space is placed in a vacuum state. The inside portion of the annular sponge plate body expands toward the inside of the suction disk so that air inside the body escapes, thus causing a reduction in volume in the direction of thickness around the entire circumference, and the suction disk adheres tightly to the surface of the object in a closely sealed state. In this case, it is not absolutely necessary that the surface of the object to which the annular sponge plate body adheres tightly (i.e., is attached by suction) be a smoothly finished surface. Even in the case of a roughly finished surface, the annular sponge plate body conforms to the surface configuration and adheres in an air-tight manner. The annular sponge plate body, which thus adheres tightly to the surface of the object and allows air to escape, functions as a series of thin plate-form rubber plate that adheres tightly to the surface of the object; and this plate body has a specified width that prevents outside air from invading the interior of the suction disk. Accordingly, the suction-holding device is safely used even for the movement of relatively large tiles, etc. which are made of stone materials such as granite and which have surfaces that are finished as rough surfaces.

Furthermore, the suction disk itself that is used in the present invention is substantially the same as a conventional suction disk in terms of the material used; and the annular sponge plate body, as a separate body, is added thereto. Accordingly, there are no particular restrictions on the material used for the annular sponge plate body; and the annular sponge plate body can easily be obtained by being stamped out from a sponge plate material consisting of a common rubber material.

Accordingly, by way of forming the annular sponge plate body by a silicone-series or urethane-series rubber material, a stronger suction-holding force is obtained with respect to the surface of the object, which facilitates the handling of the object.

Furthermore, an adhesive agent can be used to fasten the annular sponge plate body to the suction-holding surface of the suction disk. However, if the annular sponge plate body is fastened to the suction-holding surface of the suction disk via a two-sided adhesive tape, the work of fastening the annular sponge plate body to the suction-holding surface of the suction disk is accomplished without requiring any special skills. Furthermore, this fastening can be securely accomplished with no irregularity in the joining strength. Moreover, this is also convenient in cases where an annular sponge plate body whose function has deteriorated as a result of repeated use is replaced with a fresh one.

DETAILED DESCRIPTION OF THE INVENTION

Embodiment of the present invention will be concretely described below with reference to the accompanying drawings.

Figure 1:
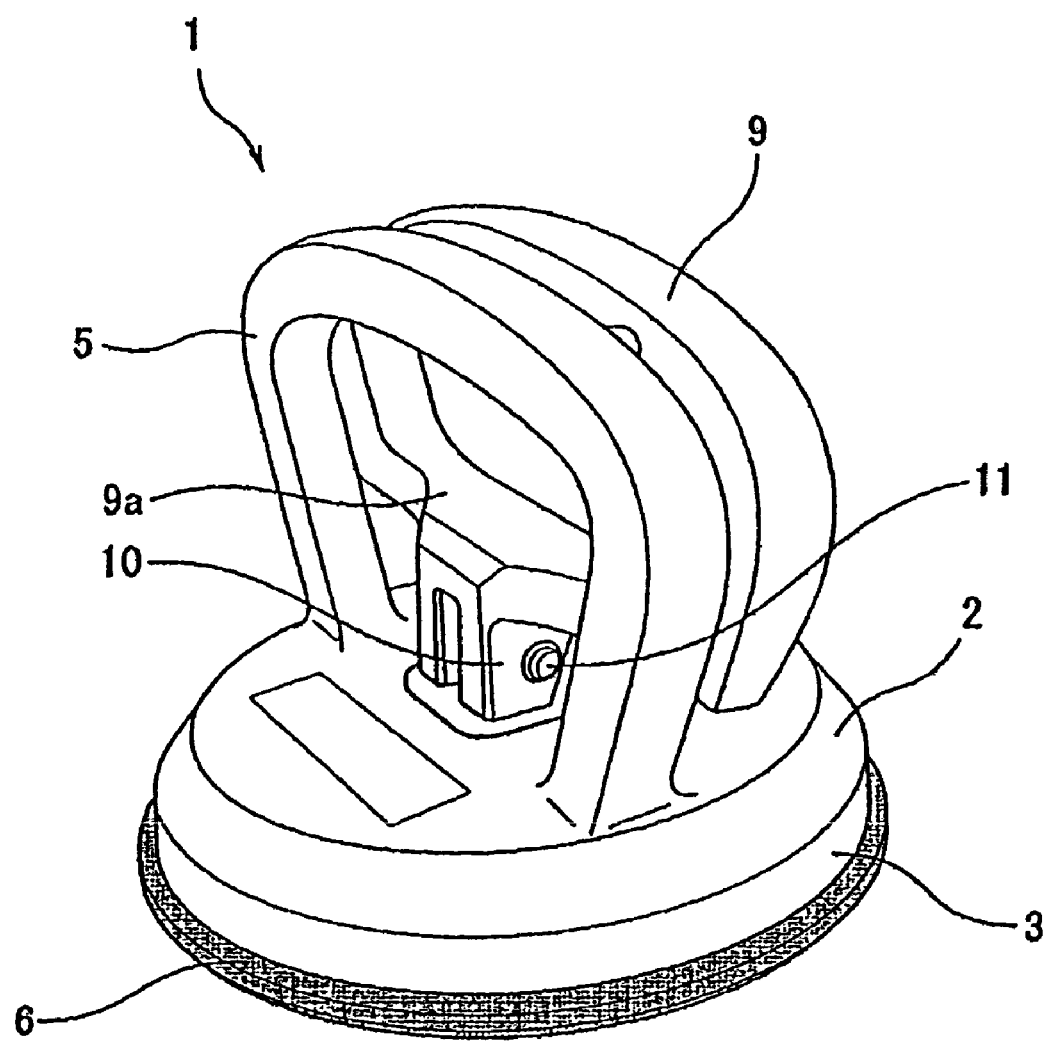
FIG. 1 is a perspective view of a suction-holding device according to an embodiment of the present invention.
Figure 2:
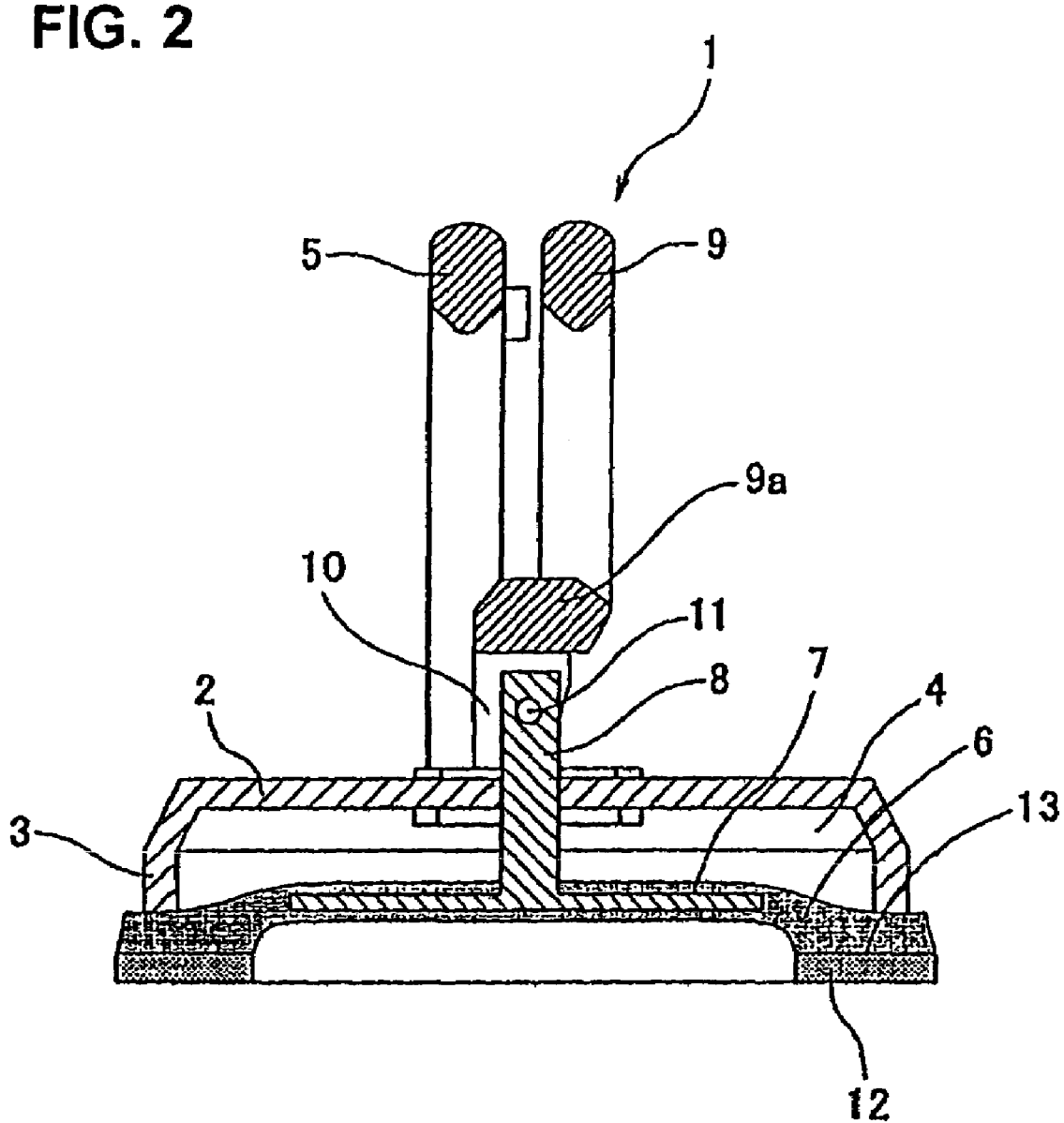
FIG. 2 is a longitudinal sectional view of the suction-holding device of the embodiment of the present invention.
Figure 3A:
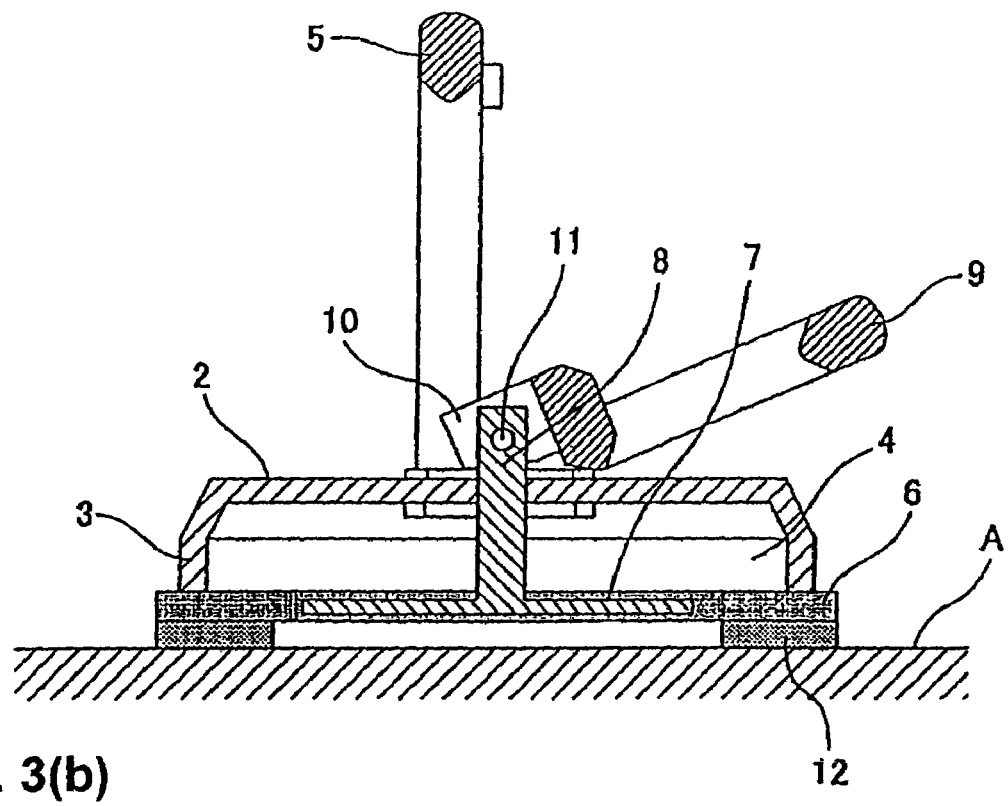
FIGS. 3(a) and 3(b) are sectional views illustrating the conditions of use of the suction-holding device of the present invention.
Figure 3B:
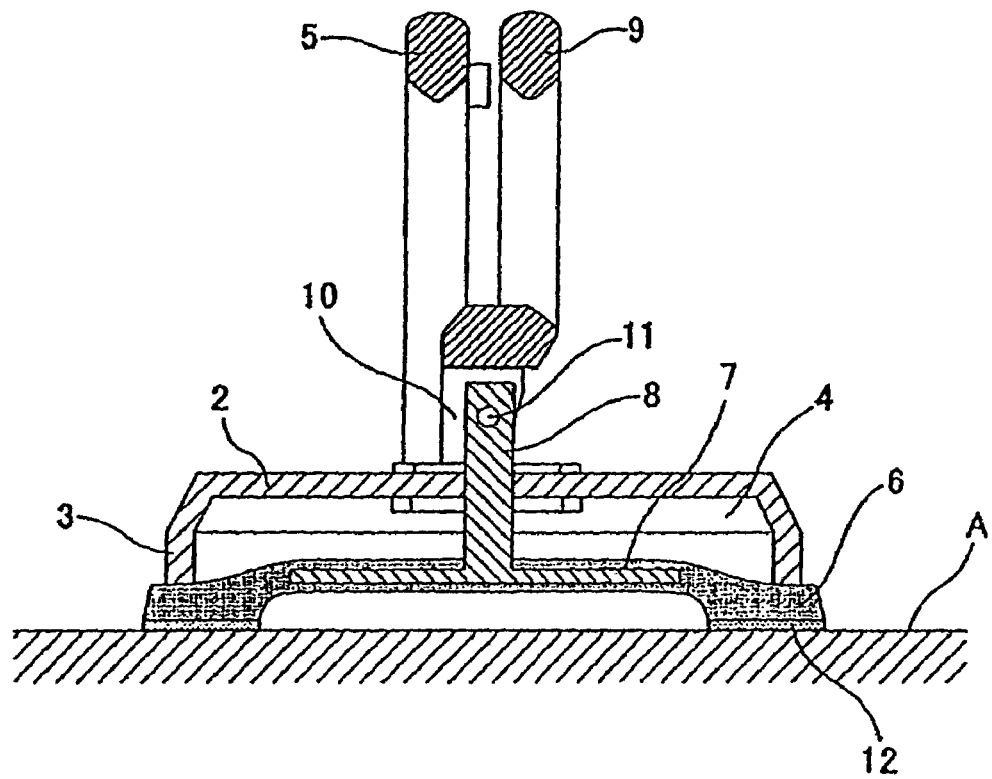
Figure 4A:
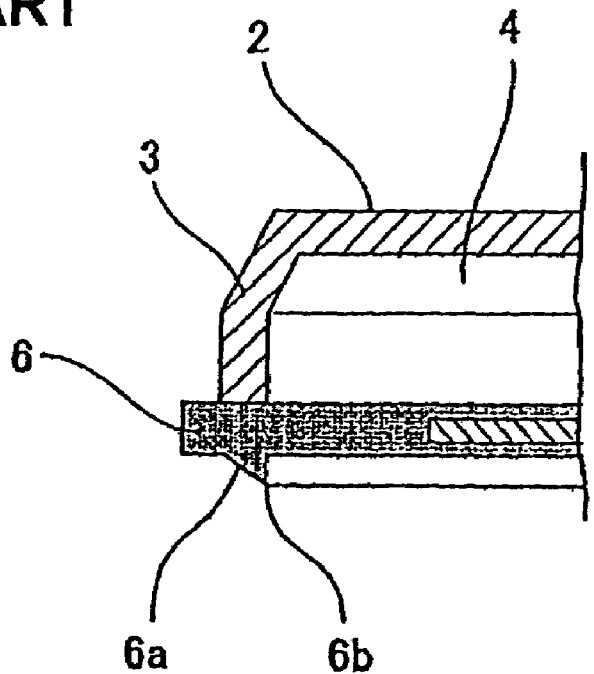
FIGS. 4(a) and 4(b) are partial sectional views illustrating the conditions of use of a conventional suction-holding device.
Figure 4B:
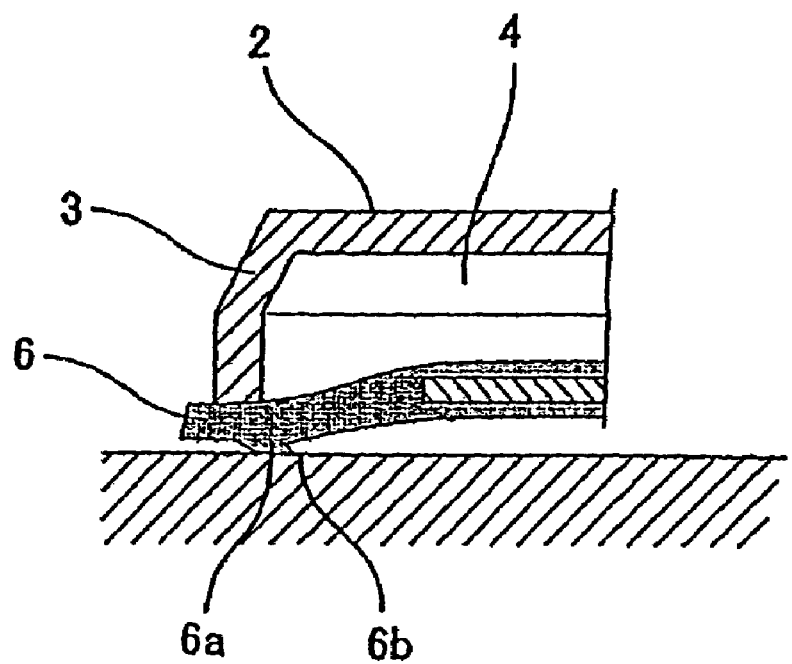

FIG. 1 is a perspective view of a suction-holding device, illustrating one embodiment of the present invention. FIG. 2 is a longitudinal sectional view of the suction-holding device. FIGS. 3(a) and 3(b) are sectional views illustrating the conditions of use of the suction-holding device of the present invention.

In these figures, the base disk body 2 that constitutes the suction-holding device 1 is a die-cast element. A hollow cavity section 4 which opens in the downward direction is formed by a protruding rim 3 which faces downward on the outer circumference of the base disk body. A handle 5 is disposed in an upright attitude on the upper surface of the base disk body.

A suction disk 6 made of a rubber material whose diameter is slightly greater than that of the base disk body 2 is disposed beneath the base disk body so that the suction disk 6 covers the hollow cavity section 4. On this suction disk 6 an operating rod 8 is provided in the vertical direction on an embedded plate 7 that is embedded in the top portion of the suction disk 6. The operating rod 8 is provided so as to protrude from the surface of the base disk body, and an operating handle 9 which disposed on the base disk body is connected to the operating rod 8 so that this operating handle 9 is pivotally moved upward and downward.

The operating handle 9 is connected to the handle 5 with the operating handle 9 being in an upright state. More specifically, bifurcated connecting member 10 is provided so as to protrude downward from a horizontal rod part 9a disposed on the bottom portion of the operating handle 9, the upper end portion of the operating rod 8 is inserted between the bifurcated connecting member 10, and the operating rod 8 is connected to the connecting member 10 by a pin 11. The operating handle 9 can be raised upward and pushed downward on the base disk body with this pin 11 as a pivoting fulcrum.

In the suction disk 6 of the present invention, an annular sponge plate body 12 is fastened to the suction-holding surface. In the shown embodiment, this annular sponge plate body 12 is formed by stamping and working a plate-form material made of a silicone-series or urethane-series rubber material, and this plate body is fastened to the suction-holding surface of the suction disk 6 via a two-sided adhesive tape 13.

The suction-holding device 1 of the present invention, which is constructed as described above, is used as in the manner described below.

As shown in FIG. 3(a), the annular sponge plate body 12 is pressed against the object surface A. Then, when the top portion of the suction disk 6 is forcefully pulled upward via the operating rod 8 by raising the operating handle 9 from this state, the space inside the suction disk surrounded by the annular sponge plate body 12 is brought in a vacuum state, and the air inside the annular sponge plate body 12 escapes. As a result, the annular sponge plate body 12 makes a reduction in volume in the direction of thickness around the entire circumference and thus adheres tightly to the object surface in a dense state as shown in FIG. 3(b). Thus, the annular sponge plate body 12 from which air has escaped functions as a series of thin plate-form rubber plate and adheres strongly to the object surface with a specified width, thus completely preventing outside air from entering the interior of the suction disk, and stabilizing the suction-holding.

Furthermore, because of its sponge characteristics, even if the object surface A is a rough surface, the surface of the annular sponge plate body 12 of the present invention can be caused to adhere to the object surface in an air-tight manner with virtually no problem. Accordingly, the suction-holding device of the present invention is safely used to move relatively large tiles, etc. that are made of stone materials such as granite and that have a roughly finished surface, thus improving the working efficiency.

The present invention is used in the manner as described above. In the suction-holding device of the present invention, an annular sponge plate body on the undersurface of the suction disk is pressed against the object surface, and the space inside the suction disk that is surrounded by the annular sponge plate body is brought into a vacuum state. The air inside the annular sponge plate body is allowed to escape so that the volume of the annular sponge plate body is compressed in the direction of thickness around the entire circumference, thus making it possible to cause the annular sponge plate body to adhere strongly to the object surface in a dense state. Accordingly, the suction-holding device of the present invention can be used safely to move relatively large tiles, etc. that are made of stone materials such as granite and that have a roughly finished surface, and the working efficiency can be improved.

What is claimed is:

1. A suction-holding device comprising:
a base disk body provided, in an undersurface thereof, with a hollow cavity section,
a suction disk disposed beneath said base disk body so as to cover said hollow cavity section,
an operating rod which is provided vertically on an embedded plate that is installed in a top portion of said suction disk, and
an operating handle disposed on said base disk body and connected to said operating rod so as to be pivotally moved up and down, so that said suction disk is suction-attached to and released from a surface of an object by a raising and lowering operation of said operating handle, wherein
said suction disk is provided on a suction-holding surface thereof with an annular sponge plate body, and
said annular sponge plate body is fastened to said suction holding surface of said suction disk by a two-sided adhesive tape.

* * * * *

UNITED STATES PATENT AND TRADEMARK OFFICE
CERTIFICATE OF CORRECTION

| | | |
|---|---|---|
| PATENT NO. | : 7,004,521 B2 | Page 1 of 1 |
| APPLICATION NO. | : 10/336560 | |
| DATED | : February 28, 2006 | |
| INVENTOR(S) | : Akinori Ishii | |

It is certified that error appears in the above-identified patent and that said Letters Patent is hereby corrected as shown below:

On Title Page Item (30) Foreign Application Priority Data:

Add --Aug. 27, 2002 (JP) ....... 2002-246159--

Signed and Sealed this

Twenty-sixth Day of February, 2008

JON W. DUDAS
*Director of the United States Patent and Trademark Office*